United States Patent
Okada et al.

(10) Patent No.: US 11,100,342 B2
(45) Date of Patent: Aug. 24, 2021

(54) IMAGE PROCESSING DEVICE AND IMAGE PROCESSING METHOD

(71) Applicant: DENSO TEN Limited, Kobe (JP)

(72) Inventors: Yasutaka Okada, Kobe (JP); Hiroaki Sano, Kobe (JP); Tetsuo Yamamoto, Kobe (JP); Atsushi Yoshihara, Kobe (JP); Jun Kanetake, Kawasaki (JP); Ryo Yoshimura, Fukuoka (JP); Tomoki Shidori, Kobe (JP)

(73) Assignee: DENSO TEN Limited, Kobe (JP)

( * ) Notice: Subject to any disclaimer, the term of this patent is extended or adjusted under 35 U.S.C. 154(b) by 65 days.

(21) Appl. No.: 16/574,422

(22) Filed: Sep. 18, 2019

(65) Prior Publication Data

US 2020/0193175 A1 Jun. 18, 2020

(30) Foreign Application Priority Data

Dec. 14, 2018 (JP) .............................. JP2018-234798

(51) Int. Cl.
*G06K 9/00* (2006.01)
*G06K 9/46* (2006.01)
*G06T 5/00* (2006.01)

(52) U.S. Cl.
CPC ..... *G06K 9/00798* (2013.01); *G06K 9/00812* (2013.01); *G06K 9/4652* (2013.01); (Continued)

(58) Field of Classification Search
CPC ........... G06K 9/00789; G06K 9/00812; G06K 9/4652; G06K 9/00798; G06T 5/008; G06T 5/009; G06T 2207/30256; G06T 2207/10024; G06T 2207/20208; G06T 7/73

See application file for complete search history.

(56) References Cited

U.S. PATENT DOCUMENTS 9,361,529 B2 6/2016 Yu et al.
9,536,155 B2 1/2017 Takemae
(Continued)

FOREIGN PATENT DOCUMENTS

CN 203318408 U 12/2013
CN 102834309 B * 12/2016 ......... G06K 9/00825
(Continued)

OTHER PUBLICATIONS

Reinhard et al, Photographic Tone Reproduction for Digital Images (2002), ACM Transactions on Graphics, 2, 4, 217-236 (Year: 2002).*

(Continued)

*Primary Examiner* — Matthew C Bella
*Assistant Examiner* — Kathleen M Broughton
(74) *Attorney, Agent, or Firm* — Oliff PLC

(57) ABSTRACT

An image processing device includes: a calculation unit which calculates chroma values of pixels of image data taken by a shooting device based on differences between R values or G values and B values, respectively; a correction unit which corrects luminance values of pixels that satisfy a prescribed condition for being a yellow pixel using the calculated chroma values as emphasis amounts, respectively; and a detection unit which detects a line drawn on a road surface based on the corrected luminance values.

15 Claims, 6 Drawing Sheets

(52) U.S. Cl.
CPC .... *G06T 5/008* (2013.01); *G06T 2207/10024* (2013.01); *G06T 2207/20208* (2013.01); *G06T 2207/30256* (2013.01)

(56) References Cited

U.S. PATENT DOCUMENTS

| | | | |
|---|---|---|---|
| 9,721,460 | B2 | 8/2017 | Takemura et al. |
| 10,311,731 | B1 | 6/2019 | Li et al. |
| 10,373,226 | B1 | 8/2019 | Russell et al. |
| 2002/0087253 | A1 | 7/2002 | Jeon |
| 2003/0128106 | A1 | 7/2003 | Ross |
| 2003/0222983 | A1 | 12/2003 | Nobori et al. |
| 2004/0254720 | A1 | 12/2004 | Tanaka et al. |
| 2006/0080035 | A1 | 4/2006 | Daubert et al. |
| 2008/0109120 | A1 | 5/2008 | Sawamoto |
| 2009/0243889 | A1 | 10/2009 | Suhr et al. |
| 2009/0278709 | A1 | 11/2009 | Endo et al. |
| 2010/0049402 | A1 | 2/2010 | Tanaka |
| 2010/0195901 | A1* | 8/2010 | Andrus ............... H04N 9/045 382/162 |
| 2010/0318467 | A1 | 12/2010 | Porter et al. |
| 2011/0006917 | A1 | 1/2011 | Taniguchi et al. |
| 2013/0027557 | A1* | 1/2013 | Hirai ............... G06K 9/00791 348/148 |
| 2013/0266188 | A1 | 10/2013 | Bulan et al. |
| 2014/0355822 | A1 | 12/2014 | Choi et al. |
| 2015/0254981 | A1 | 9/2015 | Tachibana et al. |
| 2015/0294163 | A1 | 10/2015 | Sakamoto |
| 2015/0317526 | A1 | 11/2015 | Muramatsu et al. |
| 2015/0344028 | A1 | 12/2015 | Gieseke et al. |
| 2016/0039409 | A1 | 2/2016 | Hayakawa et al. |
| 2016/0093214 | A1 | 3/2016 | Wu et al. |
| 2016/0107689 | A1 | 4/2016 | Lee |
| 2016/0272244 | A1 | 9/2016 | Imai et al. |
| 2016/0304088 | A1 | 10/2016 | Barth |
| 2017/0085790 | A1 | 3/2017 | Bohn |
| 2018/0012082 | A1 | 1/2018 | Satazoda et al. |
| 2018/0095474 | A1 | 4/2018 | Batur et al. |
| 2018/0099661 | A1 | 4/2018 | Bae et al. |
| 2018/0162446 | A1 | 6/2018 | Mikuriya et al. |
| 2018/0215413 | A1 | 8/2018 | Inagaki |
| 2018/0307919 | A1 | 10/2018 | Hayakawa |
| 2018/0307922 | A1 | 10/2018 | Yoon et al. |
| 2018/0345955 | A1 | 12/2018 | Kim et al. |
| 2019/0073902 | A1 | 3/2019 | Indoh et al. |
| 2019/0075255 | A1 | 3/2019 | Matsumoto et al. |
| 2019/0094871 | A1 | 3/2019 | Sugano |
| 2019/0370572 | A1 | 12/2019 | Nagpal et al. |
| 2020/0062242 | A1 | 2/2020 | Hayakawa |
| 2020/0074192 | A1 | 3/2020 | Ogata et al. |
| 2020/0104613 | A1 | 4/2020 | Hirai |
| 2020/0117927 | A1 | 4/2020 | Oba |
| 2020/0118310 | A1 | 4/2020 | Matsumoto et al. |
| 2020/0175634 | A1 | 6/2020 | Aggarwala et al. |
| 2020/0193643 | A1 | 6/2020 | Hess et al. |
| 2020/0398827 | A1 | 12/2020 | Hara |

FOREIGN PATENT DOCUMENTS

| | | | |
|---|---|---|---|
| JP | 2003-032669 A | | 1/2003 |
| JP | 2005-300294 A | | 10/2005 |
| JP | 2009-288867 A | | 12/2009 |
| JP | 2012-176641 A | | 9/2012 |
| JP | 2012-221375 A | | 11/2012 |
| JP | 2013-001366 A | | 1/2013 |
| JP | 2014-106731 A | | 6/2014 |
| JP | 2014-146182 A | | 8/2014 |
| JP | 2015-104982 A | | 6/2015 |
| JP | 2015-185138 A | | 10/2015 |
| JP | 2015219774 A | * | 12/2015 |
| JP | 2017-021747 A | | 1/2017 |
| JP | 2017-076275 A | | 4/2017 |
| JP | 2017-087758 A | | 5/2017 |
| JP | 2018-136695 A | | 8/2018 |
| JP | 2018-180941 A | | 11/2018 |
| KR | 2017-0102192 A | | 9/2017 |
| WO | WO-03058163 A1 * | 7/2003 | ......... G01B 9/02083 |
| WO | 2005081941 A2 | | 9/2005 |
| WO | WO-2010116922 A1 * | 10/2010 | ............... H04N 9/07 |
| WO | 2014/084118 A1 | | 6/2014 |
| WO | 2017/068699 A1 | | 4/2017 |

OTHER PUBLICATIONS

U.S. Appl. No. 16/574,395, filed Sep. 18, 2019 in the name of Yasutaka Okada et al.
U.S. Appl. No. 16/574,507, filed Sep. 18, 2019 in the name of Yasutaka Okada et al.
U.S. Appl. No. 16/574,462, filed Sep. 18, 2019 in the name of Yasutaka Okada et al.
U.S. Appl. No. 16/574,598, filed Sep. 18, 2019 in the name of Yasutaka Okada et al.
U.S. Appl. No. 16/574,503, filed Sep. 18, 2019 in the name of Yasutaka Okada et al.
U.S. Appl. No. 16/574,499, filed Sep. 18, 2019 in the name of Yasutaka Okada et al.
U.S. Appl. No. 16/574,529, filed Sep. 18, 2019 in the name of Yasutaka Okada et al.
U.S. Appl. No. 16/574,546, filed Sep. 18, 2019 in the name of Yasutaka Okada et al.
U.S. Appl. No. 16/574,393, filed Sep. 18, 2019 in the name of Yasutaka Okada et al.
U.S. Appl. No. 16/574,391, filed Sep. 18, 2019 in the name of Yasutaka Okada et al.
U.S. Appl. No. 16/574,450, filed Sep. 18, 2019 in the name of Yasutaka Okada et al.
U.S. Appl. No. 16/574,516, filed Sep. 18, 2019 in the name of Yasutaka Okada et al.
Sep. 2, 2020 Corrected Notice of Allowability issued in U.S. Appl. No. 16/574,546.
Nov. 12, 2020 Notice of Allowance issued in U.S. Appl. No. 16/574,598.
Nov. 23, 2020 Office Action Issued in U.S. Appl. No. 16/574,462.
K Choeychuen, "Available car parking space detection from webcam by using adaptive mixing features," 2012 Ninth International Joint Conference on Computer Science and Software Engineering (JCSSE) (Year: 2012).
Jun. 30, 2020 Notice of Allowance issued in U.S. Appl. No. 16/574,546.
Nov. 30, 2020 Office Action issued in U.S. Appl. No. 16/574,503.
Suhr et al., "Automatic Parking Space Detection and Tracking for Underground and Indoor Environments." IEEE Transactions on Industrial Electronics. (Year: 2016).
K. Hamada et al., "Surround View Based Parking Lot Detection and Tracking." IEEE Intelligent Vehicles Symposium (IV). (Year 2015) pp. 1106-1111.
Dec. 3, 2020 Office Action issued in U.S. Appl. No. 16/574,393.
J. Suhr et al., "A Universal Vacant Parking Slot Recognition System Using Sensors Mounted on Off-the-Shelf Vehicles." Sensors. (Year 2018).
Aug. 3, 2020 Office Action issued in U.S. Appl. No. 16/574,598.
Sep. 29, 2020 Office Action issued in U.S. Appl. No. 16/574,391.
Mar. 30, 2021 Office Action issued in U.S. Appl. No. 16/574,516.
Apr. 6, 2021 Office Action issued in U.S. Appl. No. 16/574,507.
Mar. 19, 2021 Office Action issued in U.S. Appl. No. 16/574,462.
Mar. 19, 2021 Office Action issued in U.S. Appl. No. 16/574,503.
Mar. 25, 2021 Office Action issued in U.S. Appl. No. 16/574,391.
Apr. 9, 2021 Office Action issued in U.S. Appl. No. 16/574,393.
May 19, 2021 Office Action issued in U.S. Appl. No. 16/574,395.

* cited by examiner

IMAGE PROCESSING DEVICE AND IMAGE PROCESSING METHOD

CROSS-REFERENCE TO RELATED APPLICATIONS

This application is based on and claims priority under 35 USC 119 from Japanese Patent Application No. 2018-234798 filed on Dec. 14, 2018.

TECHNICAL FIELD

The present invention relates to an image processing device and an image processing method.

BACKGROUND ART

Image processing devices are known that recognize yellow lines drawn on a road surface by synthesizing yellow images on the basis of image information of a red component and a green component to increase the contrast of lane marker images and performing recognition processing on the synthesized images (refer to JP-A-2003-32669, for example).

SUMMARY OF INVENTION

However, in the conventional technique, the load of the processing of detecting lines is large because yellow images are synthesized and the processing is performed on the synthesized images.

The present invention has been made in view of the above circumstances, and an object of the invention is therefore to provide an image processing device and an image processing method capable of detecting yellow lines correctly without undue increase of the processing load.

An image processing device according to one embodiment is equipped with a calculation unit, a correction unit, and a detection unit. The calculation unit calculates chroma values of pixels of image data taken by a shooting device on the basis of differences between R values or G values and B values, respectively. The correction unit corrects luminance values of pixels that satisfy prescribed conditions for being a yellow pixel using the calculated chroma values as emphasis amounts, respectively. The detection unit detects a line drawn on a road surface on the basis of corrected luminance values.

The one embodiment of the invention can detect yellow lines correctly without undue increase of the processing load.

DETAILED DESCRIPTION OF THE INVENTION

Image processing devices and image processing methods according to embodiments will be hereinafter described in detail with reference to the accompanying drawings. The present invention is not limited by the embodiments.

Embodiment 1

Figure 1A:
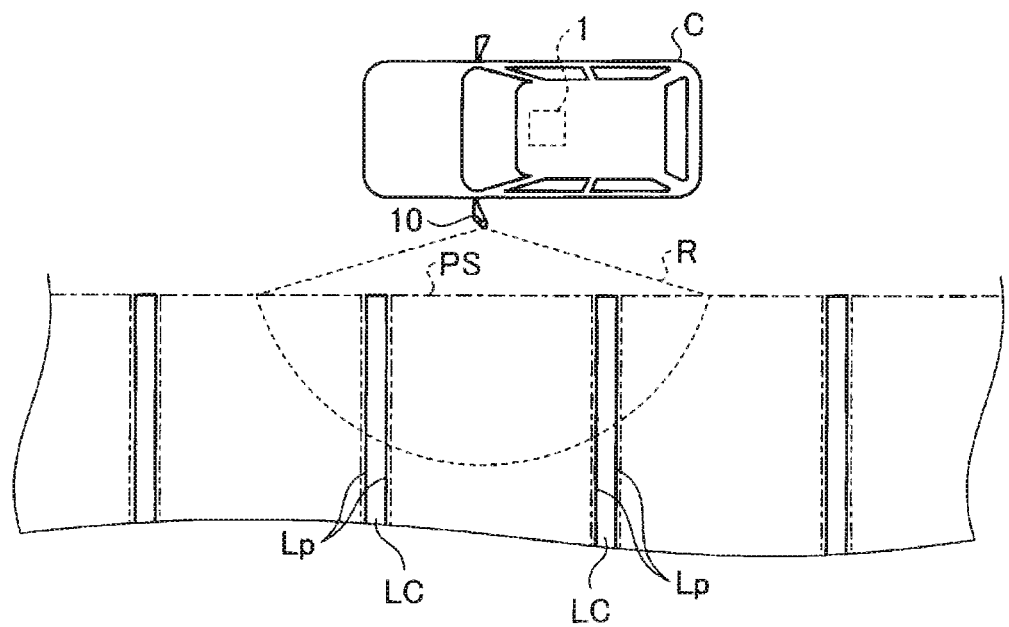
FIG. 1A shows an example manner of installation of an image processing device according to a first embodiment.
Figure 1B:
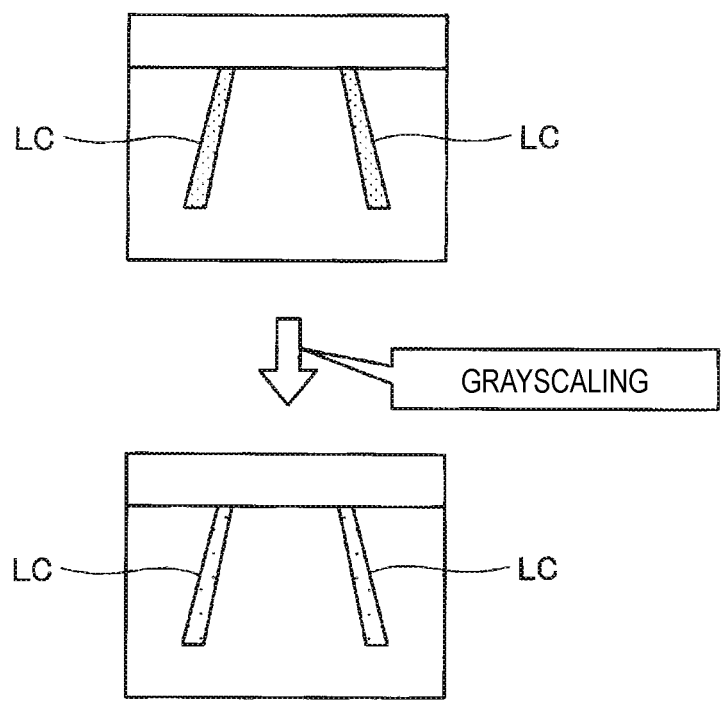
FIG. 1B shows examples of image data taken by shooting a road surface on which yellow partition lines LC are drawn and image data obtained by grayscaling the former image data.
Figure 1C:
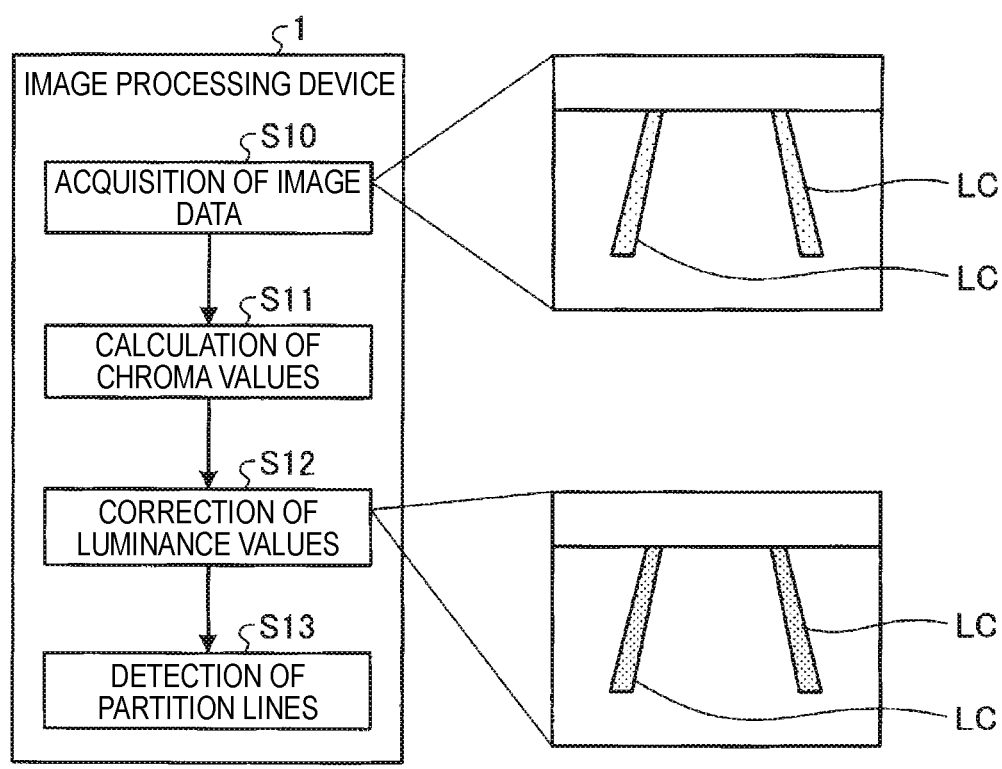
FIG. 1C outlines the image processing method according to the first embodiment.

First, the image processing device 1 according to a first embodiment will be outlined with reference to FIGS. 1A-1C. FIG. 1A shows an example manner of installation of the image processing device 1. FIG. 1B shows examples of image data taken by shooting a road surface on which yellow partition lines LC are drawn and image data obtained by grayscaling the former image data. FIG. 1C outlines the image processing method. The image processing method is performed by the image processing device 1 shown in FIGS. 1A and 1B.

As shown in FIG. 1A, the image processing device 1 is installed in a vehicle C and detects a parking frame PS on the basis of image data taken by a vehicular camera 10. The parking frame PS is a space that is defined by partition lines LC drawn on a road surface and in which the vehicle C is to be parked.

Equipped with an imaging device such as a CCD (charge-coupled device) or a CMOS (complementary metal-oxide-semiconductor) sensor, each vehicular camera 10 shoots a neighborhood of the vehicle C. The lens system of each vehicular camera 10 employs a wide-angle lens such as a fisheye lens and has an imaging range R as shown in FIG. 1A.

Although in the example of FIG. 1A the vehicular camera 10 is a left side camera for shooting a left side area around the vehicle C, plural vehicular cameras 10 are installed which include a front camera for shooting an area in front of the vehicle C, a rear camera for shooting an area in the rear of the vehicle C, and a right side camera for shooting a right side area around the vehicle C.

To detect a parking frame PS, the image processing device 1 detects partition lines LC drawn on a road surface on the basis of image data taken by a vehicular camera 10. The image processing device 1 detects a parking frame PS on the basis of information relating to the detected partition lines LC.

More specifically, the image processing device 1 converts the image data received from the vehicular camera 10 into a grayscale image (grayscaling). The grayscaling is processing of converting the value of each pixel of the image data into one of prescribed gradation levels of white to black (e.g., 256 gradation levels) according to its luminance value.

The image processing device 1 extracts edge lines each of which is a connection of edge points that are extracted on the basis of luminance values of respective pixels of the grayscale image data. The image processing device 1 detects, from the extracted edge lines, as an edge line pair Lp (hereinafter referred to as "partition line candidates"), a pair of edge lines that satisfy prescribed conditions. More specifically, the image processing device 1 detects, from the extracted edge lines, as partition line candidates Lp, a pair of edge lines that are approximately parallel with each other and have an interval that is within a prescribed range corresponding to the width of partition lines LC. That is, a pair of edge lines corresponding to left and right end lines, in the width direction, of a partition line LC are partition line candidates Lp.

Then the image processing device 1 detects, as partition lines LC, two pairs of partition line candidates Lp that are arranged parallel with each other with a prescribed interval. More specifically, the image processing device 1 detects, as each partition line LC, a region defined by a pair of edge lines that constitute partition line candidates Lp. The prescribed interval is the width of a standard parking region for common or public use that is prescribed in, for example, a law relating to parking lots.

Subsequently, the image processing device 1 detects a parking frame PS on basis of the two partition lines LC that are arranged parallel with each other with the prescribed interval. That is, the image processing device 1 detects, as a parking frame PS where the vehicle C can be parked actually, a space that is defined between the inside edge lines of the two partition lines LC.

However, where partition lines LC are drawn on a road surface with yellow paint, grayscaling reduces the contrast between pixels corresponding to the partition lines LC and pixels corresponding to the road surface (see FIG. 1B). Thus, there may occur an event that the image processing device 1 cannot detect the yellow partition lines LC correctly. In FIG. 1B, the contrast between the partition lines LC and road surface is represented by the density of dots; a higher dot density means higher contrast. This also applies to FIG. 1C.

In view of the above, in the image processing device 1 according to the first embodiment, luminance values of pixels that satisfy prescribed conditions for being a yellow pixel are corrected and thereby emphasized. The prescribed conditions for being a yellow pixel will be described later. This allows the image processing device 1 to detect yellow partition lines LC correctly.

More specifically, as shown in FIG. 1C, at step S10, the image processing device 1 acquires image data taken by a vehicular camera 10.

At step S11, the image processing device 1 calculates chroma values on the basis of the differences between R values and B values, respectively. At step S12, the image processing device 1 corrects luminance values of pixels that satisfy the conditions for being a yellow pixel using the calculated chroma values as emphasis amounts. That is, the image processing device 1 performs processing of adding the chroma values to the luminance values of only the pixels that satisfy the conditions for being a yellow pixel.

As a result, as the color of a pixel come closer to yellow, its luminance value is made larger and hence the contrast between pixels corresponding to partition lines LC and pixels corresponding to a road surface is made higher.

At step S13, the image processing device 1 detects the partition lines LC on the basis of corrected luminance values. As a result, the image processing device 1 can detect the yellow partition lines LC correctly.

Another example method for detecting yellow partition lines LC is known in which yellow images are synthesized on the basis of R values and G values and processing of detecting the partition lines LC is performed on the synthesized images. However, the processing load of this detection method is large because yellow images need to be synthesized.

In contrast, the image processing device 1 can prevent undue increase of the processing load of the detection of partition lines LC because it makes it possible to detect yellow partition lines LC more reliably by correcting luminance values of pixels that satisfy the conditions for being a yellow pixel.

As such, the image processing device 1 according to the first embodiment can detect yellow partition lines LC correctly without undue increase of the processing load.

Figure 2:
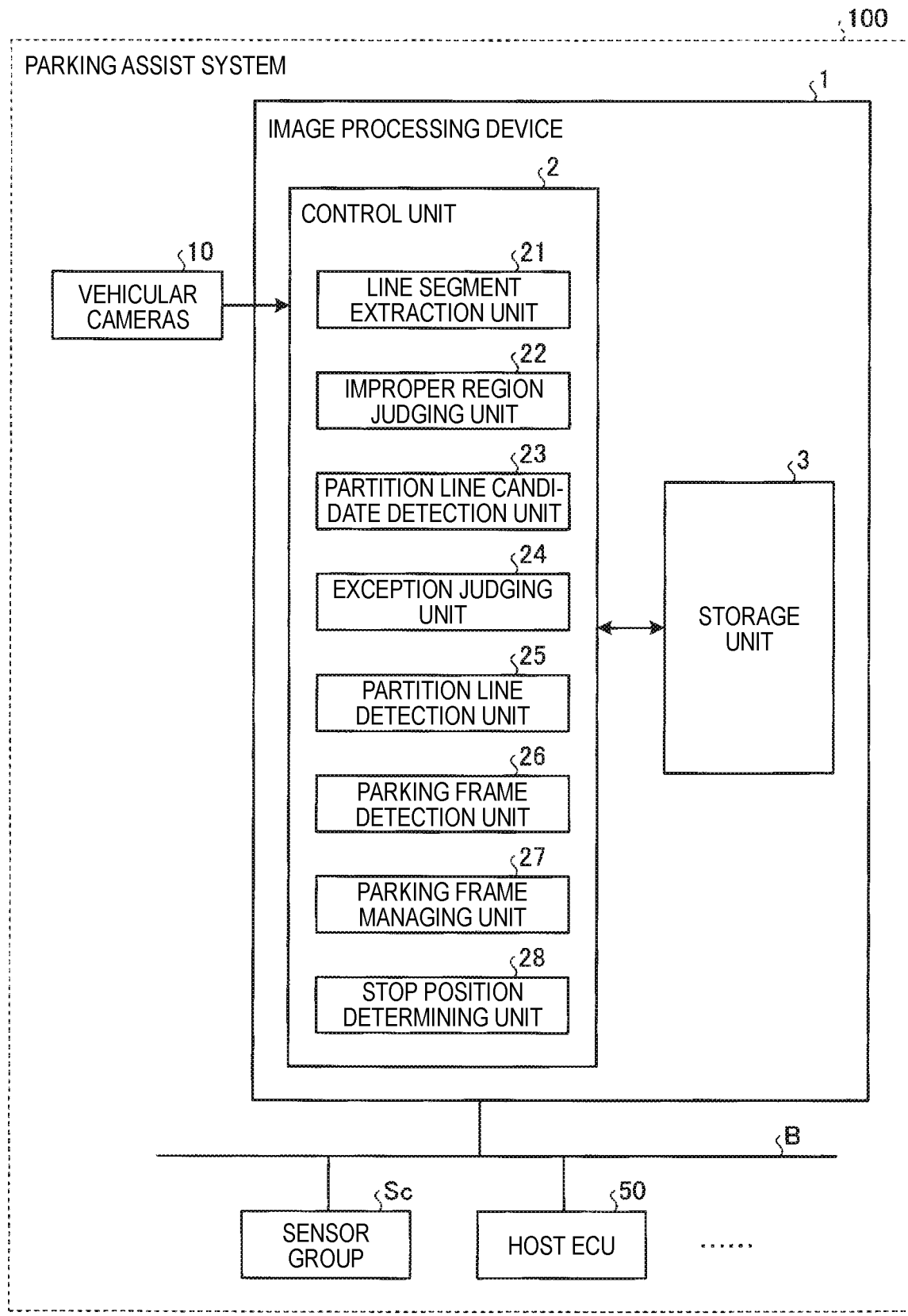
FIG. 2 is a block diagram of a parking support system including the image processing device according to the first embodiment.

Next, an example configuration of the image processing device 1 according to the first embodiment will be described with reference to FIG. 2. FIG. 2 is a block diagram of a parking assist system 100 including the image processing device 1. As shown in FIG. 2, the parking assist system 100 is equipped with the image processing device 1, vehicular cameras 10, a sensor group Sc, and a host ECU (electronic control unit) 50. As shown in FIG. 2, the image processing device 1, the sensor group Sc, and the host ECU 50 can communicate with each other via a communication bus B of the communication standard of CAN (Control Area Network) communication.

The sensor group Sc, which consists of various kinds of sensors for detecting a running state of the vehicle C, communicates detected sensor values to the image processing device 1. The sensor group Sc includes a vehicle speed sensor for detecting a rotation speed of wheels of the vehicle C, a steering angle sensor for detecting a steering angle of the vehicle C, etc.

The host ECU 50, which is, for example, a CPU for assisting automatic parking of the vehicle C, parks the vehicle C based on a parking frame PS detected by the image processing device 1. Being, for example, an EPS (electric power steering)-ECU for controlling the steering angle of the vehicle C, the host ECU 50 can control the steering angle so that the vehicle C is parked in a parking frame PS detected by the image processing device 1. The host ECU 50 may include ECUs for accelerator control and braking control.

As shown in FIG. 2, the image processing device 1 is equipped with a control unit 2 and a storage unit 3. The control unit 2 is equipped with a line segment extraction unit 21, an improper region judging unit 22, a partition line candidate detection unit 23, an exception judging unit 24, a partition line detection unit 25 (an example of the term "detection unit" used in the claims), a parking frame detection unit 26, a parking frame managing unit 27, and a stop position determining unit 28.

For example, the control unit 2 includes a computer having a CPU (central processing unit), a ROM (read-only memory), a RAM (random access memory), an HDD (hard disk drive), an input/output port, etc., and other various kinds of circuits.

The CPU of the computer functions as the line segment extraction unit 21, the improper region judging unit 22, the partition line candidate detection unit 23, the exception judging unit 24, the partition line detection unit 25, the parking frame detection unit 26, the parking frame managing unit 27, and the stop position determining unit 28 by reading out programs stored in the ROM, for example, and running them.

All or part of the line segment extraction unit 21, the improper region judging unit 22, the partition line candidate detection unit 23, the exception judging unit 24, the partition line detection unit 25, the parking frame detection unit 26, the parking frame managing unit 27, and the stop position determining unit 28 can be implemented as hardware such as an ASIC (application-specific integrated circuit) or an FPGA (field-programmable gate array).

For example, the storage unit 3 corresponds to the RAM and the HDD. The RAM and the HDD can store various kinds of information and the information of various kinds of programs. The image processing device 1 may be configured so as to acquire the various kinds of information and programs from a portable recording medium or another computer that is connected to it by wire or wirelessly via a network.

For example, the control unit 2 may execute a parking frame PS detection process either in the case where the vehicle C is considered to be running in a parking lot (e.g., the vehicle speed is lower than or equal to 30 km/h) or during all the period when the vehicle C is running.

The line segment extraction unit 21 extracts edge points from image data received from a vehicular camera 10 on the basis of their respective luminance values and extracts edge lines each of which is a connection of edge points. The details of the line segment extraction unit 21 will be described later in detail.

The line segment extraction unit 21 communicates edge information relating to the extracted edge points and edge lines to the improper region judging unit 22.

The improper region judging unit 22 judges, on the basis of the edge points and the edge lines, presence/absence of an improper region where detection of a partition line LC to constitute a parking frame PS is difficult. For example, the improper region judging unit 22 determines, as an improper region, an unpaved road surface region (e.g., graveled region) or a grating region where more edge points are detected than in a paved road surface.

More specifically, the improper region judging unit 22 can judge, as an improper region, a region where the density of edge points is higher than a prescribed value or luminance gradients of respective edge points are not uniform. The improper region judging unit 22 eliminates edge information of the improper region from the above-mentioned edge information on the basis of the thus-determined improper region and gives resulting information to the downstream stage.

The partition line candidate detection unit 23 detects (selects) partition line candidates Lp, that is, candidates for partition lines to partition a parking frame PS, from the edge lines on the basis of the edge line information. The partition line candidate detection unit 23 generates information relating to the detected partition line candidates Lp and communicates the generated to the exception judging unit 24.

The partition line candidate detection unit 23 can execute a partition line candidate Lp detection process in such a manner as to eliminate the improper region detected by the improper region judging unit 22. In other words, the partition line candidate detection unit 23 does not execute the partition line candidate Lp detection process for the improper region. This makes it possible to reduce the processing load of the control unit 2.

The exception judging unit 24 judges presence/absence of a parking prohibition region where parking of the vehicle C is not permitted, on the basis of the partition line candidates Lp detected by the partition line candidate detection unit 23. For example, the exception judging unit 24 judges presence/absence of a parking prohibition region such as a zebra zone (vehicle guiding zone).

More specifically, where it is assumed that pairs of partition line candidates Lp that are approximately parallel with each other are partition line LCs, the exception judging unit 24 judges that the region interposed between the assumed partition lines is a parking prohibition region (zebra zone) if three or more pairs of partition line candidates that are inclined with respect to the assumed partition lines LC exist at prescribed intervals.

The exception judging unit 24 can judge presence/absence of pairs of partition line candidates Lp that are not necessary for detection of a parking frame PS, such as (part of) a road surface marking. For example, the exception judging unit 24 can detect a road surface marking contained in image data by matching pairs of partition line candidates Lp detected by the partition line candidate detection unit 23 with template models of respective road surface markings.

The exception judging unit 24 eliminates the unnecessary pairs of partition line candidates Lp from the information relating to the partition line candidates Lp, adds information indicating the parking prohibition region to the information relating to the partition line candidates Lp, and communicates the resulting information to the parking frame detection unit 26.

The partition line detection unit 25 detects partition lines LC on the basis of the partition line candidates Lp detected by the partition line candidate detection unit 23.

The parking frame detection unit 26 detects a parking frame PS on the basis of the partition lines LC detected by the partition line detection unit 25. The parking frame detection unit 26 can detect a parking frame PS so as to exclude the parking prohibition region determined by the exception judging unit 24.

That is, the parking frame detection unit 26 detects a parking frame PS so as to exclude a zebra zone or the like. Upon detecting the parking frame PS, the parking frame detection unit 26 communicates parking frame information relating to the detected parking frame PS to the parking frame managing unit 27. Each piece of parking frame information includes apex coordinates of each partition line LC with reference to the vehicle C.

The parking frame managing unit 27 manages, in time series, the partition frame parking frame PS detected by the parking frame detection unit 26. The parking frame managing unit 27 can estimate a movement distance of the vehicle C on the basis of sensor values received from the sensor group Sc and estimate apex coordinates of current apex coordinates of each partition line on the basis of the movement distance and past parking frame information.

Furthermore, the parking frame managing unit 27 can update the coordinate information of the partition lines LC of past parking frame information on the basis of newly received parking frame information. That is, the parking frame managing unit 27 updates the relative positional relationship between the vehicle C and the parking frame PS at such occasions as the vehicle C moves.

Still further, it is also possible for the parking frame managing unit 27 to set a parking frame PS detection range with an assumption that plural parking frames PS are arranged continuously. For example, the parking frame managing unit 27 assumes that plural parking frames PS exist continuously including one parking frame PS (reference parking frame) detected by the parking frame detection unit 26.

And the parking frame managing unit 27 sets the thus-assumed range of the plural parking frames PS as a detection range. With this measure, it suffices for the above-described line segment extraction unit 21 to execute the edge line detection process only for the detection range set by the parking frame managing unit 27, whereby the processing load of the control unit 2 can be reduced.

The stop position determining unit 28 determines a stop position of the vehicle C, that is, a parking position in the parking frame PS, on the basis of the parking frame information and the edge information. For example, the stop position determining unit 28 determines a stop position of the vehicle C by detecting sprags or a curb, a wall, a white line extending in the vehicle width direction, or the like on the basis of the edge lines detected by the line segment extraction unit 21.

When detecting sprags, the stop position determining unit 28 determines a stop position so that the bottom portions of the rear wheels of the vehicle C will be located just in front of the sprags. When detecting a white line, a wall, or the like rather than sprags, the stop position determining unit 28 determines a stop position so that the rear end (e.g., the end of the rear bumper) of the vehicle C will be located just in front of it.

Figure 3:
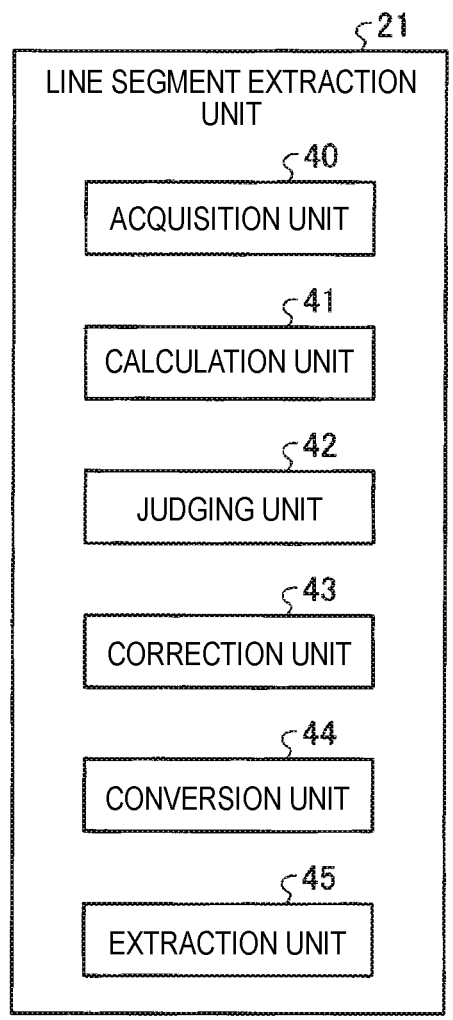
FIG. 3 is a block diagram of a line segment extraction unit.

Next, an example configuration of the line segment detection unit 23 will be described with reference to FIG. 3. FIG. 3 is a block diagram of the line segment detection unit 23. As shown in FIG. 3, the partition line detection unit 23 is equipped with an acquisition unit 40, a calculation unit 41, a judging unit 42, a correction unit 43, a conversion unit 44, and an extraction unit 45.

The acquisition unit 40 acquires image data taken by a vehicular camera 10.

The calculation unit 41 calculates luminance values of respective pixels of the acquired image data. Furthermore, the calculation unit 41 calculates, as emphasis amounts, chroma values of pixels that satisfy prescribed conditions for being a yellow pixel. The chroma value is the difference between an R value and a B value. The calculation unit 41 calculates luminance values (emphasis amounts) only for pixels that satisfy the prescribed conditions for being a yellow pixel.

The judging unit 42 judges whether each pixel satisfies the prescribed conditions for being a yellow pixel. Although yellow should have R, G, and B values (255, 255, 0), these values are not always obtained depending on the color of a paint that is used actually to draw partition lines LC and the environment (e.g., deterioration of partition lines LC and ambient brightness).

The formulae for conversion from the RGB color space to the HSV color space are given by:

$$H = \begin{cases} \text{undefined,} & \text{if MIN = MAX} \\ 60 \times \frac{G-R}{\text{MAX} - \text{MIN}} + 60, & \text{if MIN = B} \\ 60 \times \frac{B-G}{\text{MAX} - \text{MIN}} + 180, & \text{if MIN = R} \\ 60 \times \frac{R-B}{\text{MAX} - \text{MIN}} + 300, & \text{if MIN = G} \end{cases} \quad (1)$$

$$V = \text{MAX} \quad (2)$$

$$S = \text{MAX} - \text{MIN} \quad (3)$$

MAX and MIX are the largest value and the smallest value, respectively, among R, G, and B values.

A yellow hue range in the HSV color space is around 60°. Thus, for a color to be yellow, it should have the following features (a)-(d):

(a) The B value is smallest among the R, G, and B values.
(b) The difference between the R value and the G value is small.
(c) The difference between the R value (or G value) and the B value is large.
(d) The R value (or G value) is large.

Thus, in the first embodiment, the following conditions (A)-(D) are employed as the prescribed conditions for being a yellow pixel:

(A) The difference between the R value and the G value is smaller than or equal to a first prescribed value.
(B) The difference between the R value and the B value is larger than or equal to a second prescribed value.
(C) The difference between the G value and the B value is larger than or equal to a third prescribed value.
(D) The R value is larger than or equal to a fourth prescribed value.

The first to fourth prescribed values are preset values.

The judging unit 42 judges that a pixel that satisfies all of the conditions (A)-(D) is a pixel that satisfies the conditions for being a yellow pixel. The judging unit 42 judges that a pixel that does not satisfy any of the conditions (A)-(D) is a pixel that does not satisfy the conditions for being a yellow pixel.

The judging unit 42 judges, for every pixel of the image data, whether it satisfies the prescribed conditions for being a yellow pixel, and then judges whether the grayscaling on the image data has finished.

The correction unit 43 corrects the luminance value of each pixel that satisfies the conditions for being a yellow pixel by adding an emphasis amount to the luminance value.

The correction unit 43 adds an emphasis amount that is smaller than or equal to a maximum emphasis amount. The maximum emphasis amount is an emphasis amount that occurs at a high frequency in yellow partition lines LC, and is set on the basis of actual image data that were taken by shooting various yellow partition lines LC. If an emphasis amount (chroma value) calculated from the acquired image data is larger than the maximum emphasis amount, the correction unit 43 adds the maximum emphasis amount to the pixel value of the pixel.

This increases the contrast between pixels that satisfy the conditions for being a yellow pixel and pixels that do not. The reasons why as mentioned above the difference between an R value and a B value is employed as an emphasis amount (chroma value) are the above features (a) and (d) of the conditions for being a yellow pixel. Yellow pixels have features that (a) the B value is smallest among the R, G, and B values and (d) the R value is large. Thus, each of pixels corresponding to a yellow partition line LC is large in the difference between the R value and the B value.

The correction unit 43 can increase the contrast between pixels corresponding to a yellow partition line LC and pixels corresponding to a road surface according to the features of the yellow partition line LC by adding, to the luminance value of each pixel satisfying the conditions for being a yellow pixel, as an emphasis amount, the difference between the R value and the B value of the pixel that reflects the features of yellow partition line LC.

The conversion unit 44 performs grayscaling on the acquired image data. The conversion unit 44 normalizes the luminance value of each pixel of the image data and thereby expresses each pixel in the form of one of gradation levels of white to black (e.g., 256 gradation levels) according to its luminance value. For example, where the acquired image data is of 16 bits, the conversion unit 44 converts it into 8-bit grayscale image data.

The conversion unit 44 normalizes corrected (i.e., emphasis-amount-added) luminance values. More specifically, the conversion unit 44 performs normalization so that a value obtained by adding a maximum emphasis amount to a maximum possible luminance value before the correction becomes a maximum luminance value after the grayscaling.

For pixels that satisfy the conditions for being a yellow pixel, the conversion unit 44 normalizes corrected (i.e., emphasis-amount-added) luminance values. For pixels that do not satisfy the conditions for being a yellow pixel, the conversion unit 44 normalizes as-calculated luminance values, that is, luminance values to which no emphasis amount is added. In these manners, the conversion unit 44 normalizes the luminance values of all the pixels of the image data.

Figure 4:
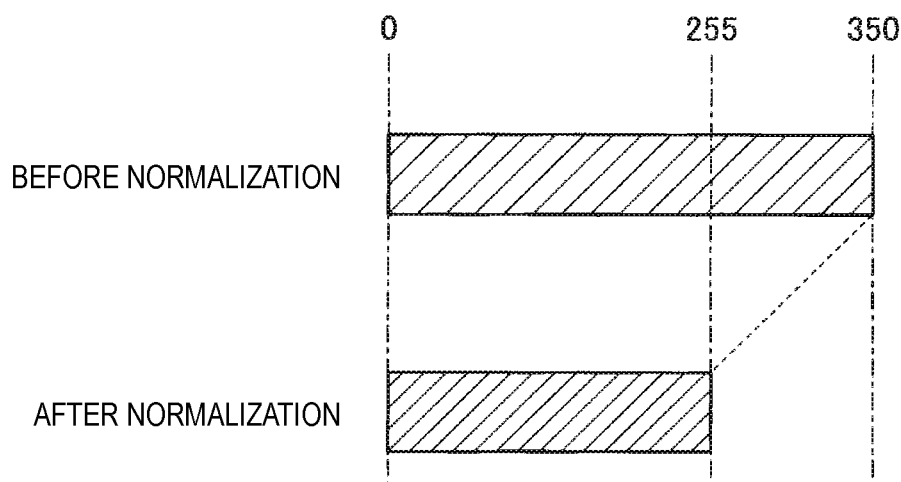
FIG. 4 shows an example manner of normalization performed in the first embodiment.

An example of the normalization performed by the conversion unit 44 will be described with reference to FIG. 4. FIG. 4 shows an example manner of normalization performed in the first embodiment. In this example, it is assumed that a maximum emphasis amount "95" is set and a pixel of acquired image data having a luminance value "255" is added with this maximum emphasis amount.

In this example, normalization is performed so that a luminance value "350" obtained by adding the maximum emphasis amount "95" to the luminance value "255" of the pixel concerned before the normalization is changed to "255." That is, for pixels that satisfy the conditions for being a yellow pixel, corrected luminance values are normalized at a compression ratio 255/350. For pixels that do not satisfy the conditions for being a yellow pixel, as-calculated luminance values are normalized at the same compression ratio 255/350.

Returning to FIG. 3, the extraction unit 45 calculates an edge intensity value and a luminance gradient of each pixel by, for example, applying a Sobel filter to grayscale image data. Then the extraction unit 45 extracts edge points by extracting pixels whose edge intensity values are larger than a preset, prescribed intensity value and extracts edge lines by connecting adjacent edge points.

As described above, for pixels corresponding to yellow partition lines LC, luminance values are corrected, edge lines are extracted on the basis of corrected luminance values, and the partition lines LC are detected. As such, the image processing device 1 can detect yellow partition lines LC correctly without undue increase of the processing load.

Figure 5:
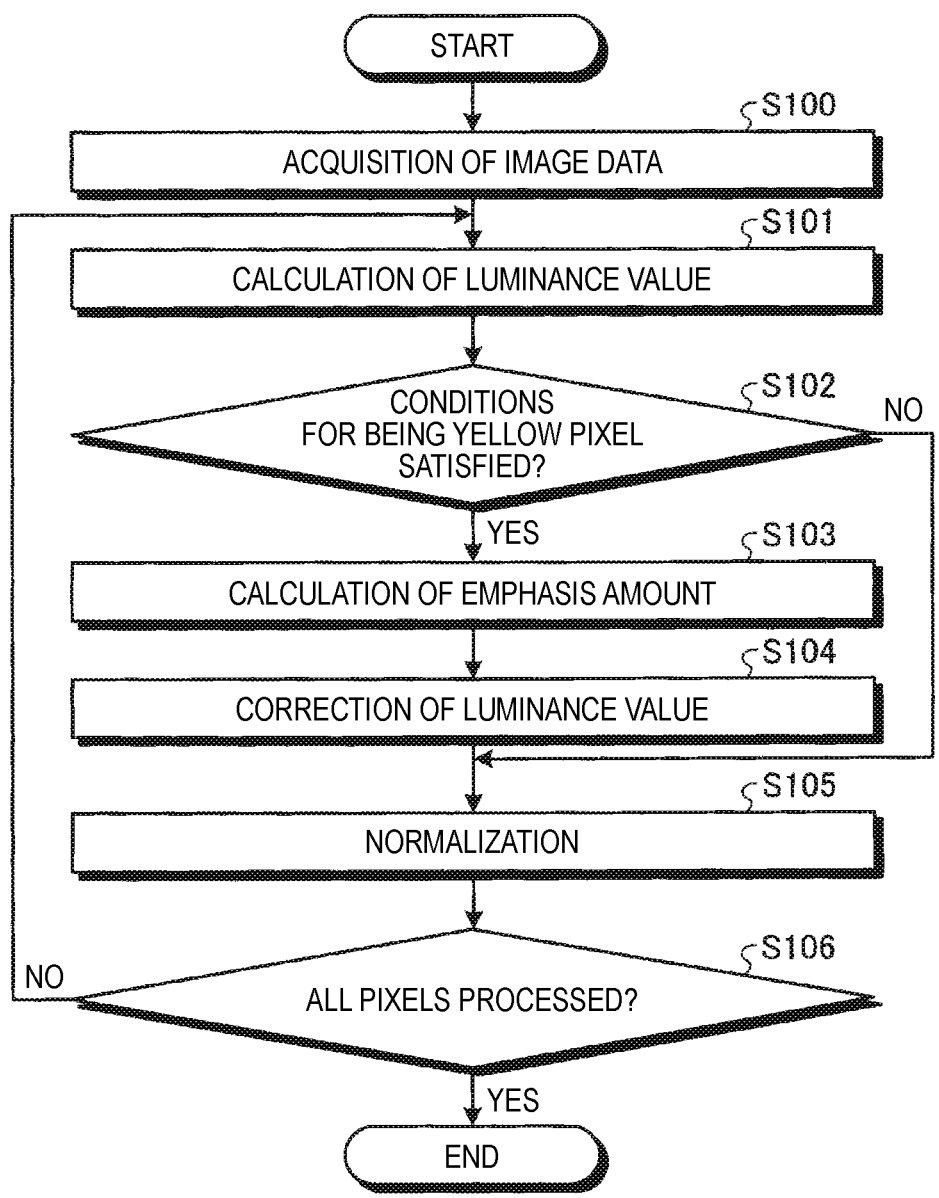
FIG. 5 is a flowchart showing a yellow emphasis process employed in the first embodiment.
Figure 6:
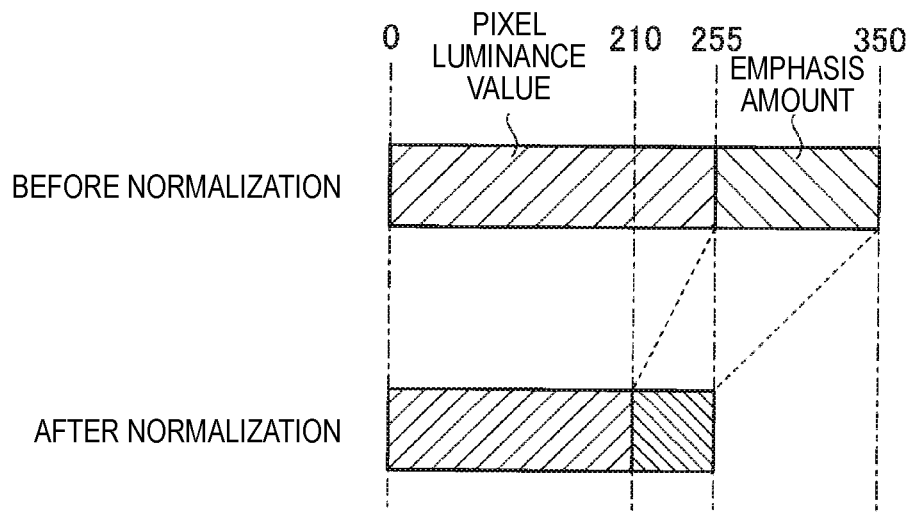
FIG. 6 shows an example manner of normalization performed in a second embodiment.

Next, the yellow emphasis process that is employed in the first embodiment will be described with reference to FIG. 5. FIG. 5 is a flowchart showing the yellow emphasis process employed in the first embodiment.

At step S100, the image processing device 1 acquires image data taken by a vehicular camera 10.

At step S101, the image processing device 1 calculates a luminance value of a pixel of the acquired image data. At step S102, the image processing device 1 judges whether the pixel of the acquired image data satisfies the conditions for being a yellow pixel. When return is made from step S106, the image processing device 1 calculates a luminance value of a new pixel at step S101 and judges whether the new pixel satisfies the conditions for being a yellow pixel at step S102.

If the pixel satisfies the conditions for being a yellow pixel (S102: yes), the image processing device 1 calculates an emphasis amount at step S103 and corrects the luminance value of the pixel by adding the calculated emphasis amount to it at step S104.

At step S105, the image processing device 1 normalizes the luminance value. More specifically, the image processing device 1 normalizes the corrected luminance value if the pixel satisfies the conditions for being a yellow pixel. And the image processing device 1 normalizes the original luminance value of the pixel if the pixel does not satisfy the conditions for being a yellow pixel.

At step S106, the image processing device 1 judges whether the above steps have been executed for all the pixels of the image data, that is, whether the grayscaling on the image data has been finished. If judging that the above steps have been executed for all the pixels of the image data (S106: yes), the image processing device 1 finishes the execution of the process of FIG. 5.

If there remains a pixel(s) that has not been subjected to the above steps (S106: no), the image processing device 1 returns to step S101 and executes the above steps for a new pixel.

Next, advantages of the image processing device 1 according to the first embodiment will be described.

The image processing device 1 calculates a chroma value of each pixel that is the difference between an R value and a B value and corrects the luminance value of the pixel by adding the calculated chroma value to it as an emphasis amount if the pixel satisfies the conditions for being a yellow pixel. The image processing device 1 detects partition lines LC on the basis of the corrected luminance values.

With this measure, the image processing device 1 can increase luminance values of pixels that satisfy conditions for being a yellow pixel and thereby increase the contrast between pixels corresponding to partition lines LC and pixels corresponding to a road surface. As such, the image processing device 1 can detect yellow partition lines LC without the need for, for example, synthesizing new yellow images on the basis of R values and G values. As a result, the image processing device 1 can detect yellow partition lines LC correctly without undue increase of the processing load of detection of the partition lines LC.

The image processing device 1 normalizes corrected luminance values of image data.

With this measure, the image processing device 1 can normalize luminance values of image data in a state that the contrast between pixels corresponding to yellow partition lines LC and pixels corresponding to a road surface is increased. As such, the image processing device 1 can detect yellow partition lines LC correctly.

The image processing device 1 corrects luminance values of pixels that satisfy conditions for being a yellow pixel using, as an upper limit, a maximum emphasis amount that is set on the basis of actual image data.

With this measure, the image processing device 1 can correct luminance values of pixels that satisfy conditions for being a yellow pixel and normalize luminance values of image data without the need for searching for a pixel to be given a largest emphasis amount among the pixels of acquired image data. As such, the image processing device 1 can suppress increase of the processing load.

The image processing device 1 calculates chroma values (emphasis amounts) only for pixels that satisfy the conditions for being a yellow pixel.

With this measure, the image processing device 1 can suppress increase of the processing load.

The image processing device 1 calculates the difference between an R value and a B value as a chroma value. The image processing device 1 judges, to be a pixel that satisfies the conditions for being a yellow pixel, a pixel in which the difference between the R value and the B value is smaller than or equal to the first prescribed value, the difference between the R value and the B value is larger than or equal to the second prescribed value, the difference between the G value and the B value is larger than or equal to the third prescribed value, and the R value is larger than or equal to the fourth prescribed value and corrects its luminance value.

With this measure, the image processing device 1 can correct luminance values of pixels that satisfy the conditions for being a yellow pixel and thereby detect yellow partition lines LC correctly.

Embodiment 2

Next, an image processing device 1A according to a second embodiment will be described. Differences from the first embodiment will mainly be described below. The image processing device 1A according to the second embodiment is different from the image processing device 1 according to the first embodiment in the normalization method and the same as the latter in the other part of each of the configuration and the process. Descriptions of the same part will be omitted.

A conversion unit 44A of the image processing device 1A according to the second embodiment performs normalization in such a manner as to compress luminance values of pixels of image data and emphasis amounts at different compression ratios. The compression ratio is a value obtained by dividing a luminance value after normalization by that before the normalization. The degree of compression is higher when the value of the compression ratio is smaller.

More specifically, the conversion unit 44A performs normalization in such a manner as to compress luminance values of pixels of image data at a first compression ratio and compresses emphasis amounts at a second compression ratio. The second compression ratio is smaller than the first compression ratio. That is, the degree of compression of emphasis amounts is higher than that of luminance values of pixels of image data.

An example of the normalization performed by the conversion unit 44 will be described with reference to FIG. 5. FIG. 5 shows an example of the normalization performed in the second embodiment. In this example, it is assumed that a maximum emphasis amount "95" is set and a pixel of acquired image data having a luminance value "255" is added with this maximum emphasis amount.

In this case, as in the first embodiment, normalization is performed so that a luminance value "350" obtained by adding the maximum emphasis amount "95" to the luminance value (maximum luminance value) "255" of the pixel concerned before the normalization is changed to "255."

The luminance value of the pixel of the acquired image data is compressed from "255" to "210" and hence the first compression ratio is equal to "0.82." The (maximum) compression amount is compressed from "95" to "45" and hence the second compression ratio is equal to "0.47." Thus, the second compression ratio is higher in the degree of compression than the first compression ratio.

As described above, pixels that satisfy the conditions for being a yellow pixel are normalized in such a manner that luminance values of pixels of acquired image data are compressed at the first compression ratio (e.g., 210/255) and emphasis amounts are compressed at the second compression ratio (e.g., 45/95). Pixels that do not satisfy the conditions for being a yellow pixel are normalized in such a manner that luminance values of the acquired image data are normalized at the first compression ratio (e.g., 210/255).

Next, advantages of the image processing device 1A according to the second embodiment will be described.

The image processing device 1A performs normalization in such a manner as to compress luminance values of pixels of acquired image data and emphasis amounts at different compression ratios. The image processing device 1A performs normalization in such a manner as to compress luminance values of pixels of the acquired image data at the first compression ratio irrespective of whether they satisfy conditions for being a yellow pixel.

With this measure, the image processing device 1A can correct luminance values of pixels that satisfy the conditions for being a yellow pixel while suppressing a change of the contrast between the luminance values of the pixels that satisfy the conditions for being a yellow pixel and luminance values of pixels that do not satisfy the conditions for being a yellow pixel. As such, the image processing device 1A can correct (emphasis) luminance values of pixels that satisfy the conditions for being a yellow pixel in a state the contrast between the pixels of image data is maintained. As a result, the image processing device 1A can detect yellow partition lines LC correctly with only small changes in the contrast of the image data.

In the image processing device 1A, the second compression ratio is set smaller (the degree of compression is higher) than the first compression ratio.

If the degree of compression of the first compression ratio were set higher, the contrast between pixels of image data would be made lower, which, for example, makes it difficult to extract edge lines corresponding to white partition lines LC correctly. This may cause an event that partition lines LC cannot be detected correctly. In contrast, the image processing device 1A can correct luminance values of pixels that satisfy the conditions for being a yellow pixel while attaching importance to the contrast between pixels of image data. As such, the image processing device 1A can detect both of white partition lines LC and yellow partition lines LC correctly.

Next, image processing devices according to modifications will be described.

An image processing device according to a modification calculates the difference between a G value and a B value as a chroma value (emphasis amount). Furthermore, the condition (D) "the R value is larger than or equal to a fourth prescribed value" of the conditions for being a yellow pixel is changed to "the G value is larger than or equal to a fourth prescribed value."

The image processing device according to this modification can detect greenish yellow partition lines LC correctly.

An image processing device according to another modification corrects luminance values of all pixels by adding emphasis amounts to the respective luminance values of all the pixels with the emphasis amount for pixels that do not satisfy the conditions for being a yellow pixel set equal to "0."

An image processing device according to a further modification performs normalization after calculating emphasis amounts with no maximum emphasis amount set.

It is noted that the above-described yellow emphasis process can be applied to detection of yellow lines other than partition lines LC (parking frame PS), such as yellow lanes drawn on a road surface.

Those skilled in the art could derive further advantages and modifications easily. Thus, broader modes of the invention are not limited to the particular and typical detailed embodiment described above. Various modifications are therefore possible without departing from the spirit and scope of the comprehensive inventive concept that is defined by the accompanying claims and its equivalents.

LIST OF REFERENCE SYMBOLS

1: image processing device
10: Vehicular cameras (shooting devices)
21: Line segment extraction unit
25: Partition line detection unit (detection unit)
40: Acquisition unit
41: Calculation unit
42: Judging unit 43: Correction unit
44: Conversion unit
45: Extraction unit

What is claimed is:

1. An image processing device comprising:
   a calculation unit which calculates chroma values of pixels of image data taken by a shooting device based on differences between R values or G values and B values, respectively;
   a correction unit which corrects luminance values of pixels that satisfy a prescribed condition for being a yellow pixel using the calculated chroma values as emphasis amounts, respectively; and
   a detection unit which detects a line drawn on a road surface based on the corrected luminance values, wherein:
   the calculation unit calculates, as the chroma values, differences between the R values and the B values, respectively; and
   the correction unit corrects luminance values of pixels each of which satisfies
   (A) a difference between the R value and the G value is smaller than or equal to a first prescribed value;
   (B) a difference between the R value and the B value is larger than or equal to a second prescribed value;
   (C) a difference between the G value and the B value is larger than or equal to a third prescribed value; and
   (D) the R value or the G value is larger than or equal to a fourth prescribed value.

2. The image processing device according to claim 1, further comprising a conversion unit which normalizes luminance values of the pixels of the image data using the corrected luminance values,
   wherein the detection unit detects the line based on the normalized luminance values.

3. The image processing device according to claim 1, wherein the correction unit corrects the luminance values of the pixels that satisfy the prescribed condition for being a yellow pixel using, as an upper limit, a maximum emphasis amount that is set in advance based on actual image data.

4. The image processing device according to claim 2, wherein the correction unit corrects the luminance values of the pixels that satisfy the prescribed condition for being a yellow pixel using, as an upper limit, a maximum emphasis amount that is set in advance based on actual image data.

5. The image processing device according to claim 2, wherein the conversion unit performs normalization by compressing the luminance values of the pixels of the image data and the emphasis amounts at different compression ratios.

6. The image processing device according to claim 4, wherein the conversion unit performs normalization by compressing the luminance values of the pixels of the image data and the emphasis amounts at different compression ratios.

7. The image processing device according to claim 5, wherein, in the conversion unit, a compression ratio of the emphasis amounts is set higher, in a degree of compression, than a compression ratio of the luminance values of the pixels of the image data.

8. The image processing device according to claim 6, wherein, in the conversion unit, a compression ratio of the emphasis amounts is set higher, in a degree of compression, than a compression ratio of the luminance values of the pixels of the image data.

9. The image processing device according to claim 1, wherein the calculation unit calculates the chroma values of only the pixels that satisfy the prescribed condition for being a yellow pixel.

10. The image processing device according to claim 2, wherein the calculation unit calculates the chroma values of only the pixels that satisfy the prescribed condition for being a yellow pixel.

11. The image processing device according to claim 3, wherein the calculation unit calculates the chroma values of only the pixels that satisfy the prescribed condition for being a yellow pixel.

12. The image processing device according to claim 4, wherein the calculation unit calculates the chroma values of only the pixels that satisfy the prescribed condition for being a yellow pixel.

13. The image processing device according to claim 5, wherein the calculation unit calculates the chroma values of only the pixels that satisfy the prescribed condition for being a yellow pixel.

14. The image processing device according to claim 6, wherein the calculation unit calculates the chroma values of only the pixels that satisfy the prescribed condition for being a yellow pixel.

15. An image processing method comprising:
    calculating chroma values of pixels of image data taken by a shooting device based on differences between R values or G values and B values, respectively;
    correcting luminance values of pixels that satisfy a prescribed condition for being a yellow pixel using the calculated chroma values as emphasis amounts, respectively; and
    detecting a line drawn on a road surface based on the corrected luminance values, wherein:
    the calculating calculates, as the chroma values, differences between the R values and the B values, respectively; and
    the correcting corrects luminance values of pixels each of which satisfies
    (A) a difference between the R value and the G value is smaller than or equal to a first prescribed value;
    (B) a difference between the R value and the B value is larger than or equal to a second prescribed value;
    (C) a difference between the G value and the B value is larger than or equal to a third prescribed value; and
    (D) the R value or the G value is larger than or equal to a fourth prescribed value.

* * * * *